Figure 1:
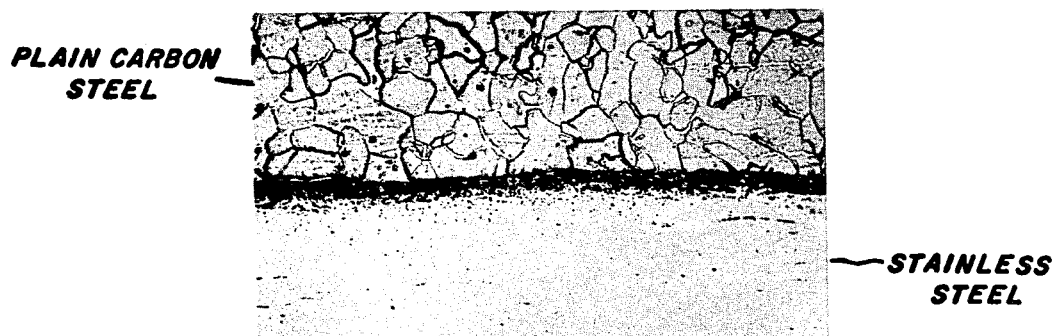

United States Patent [19]

Chivinsky

[11] 3,956,809

[45] May 18, 1976

[54] PRESSURE BONDED COMPOSITE MATERIAL WITH LOW YIELD STRENGTH

[75] Inventor: Joseph A. Chivinsky, Sarver, Pa.

[73] Assignee: Allegheny Ludlum Industries, Inc., Pittsburgh, Pa.

[22] Filed: May 1, 1974

[21] Appl. No.: 465,781

Related U.S. Application Data

[60] Continuation of Ser. No. 257,649, May 30, 1972, abandoned, which is a division of Ser. No. 177, Jan. 2, 1970, Pat. No. 3,693,242.

[52] U.S. Cl. ............................ 29/196.1; 75/123 J; 75/123 M
[51] Int. Cl.$^2$ .................................... B32B 15/18
[58] Field of Search .................... 75/123 J, 123 M; 29/196.1

[56] References Cited
UNITED STATES PATENTS

| 2,653,117 | 9/1953 | Keene | 148/12 |
| 2,791,517 | 5/1957 | Becker | 117/107 |
| 2,963,129 | 12/1960 | Eberle | 29/196.1 X |
| 3,333,987 | 8/1967 | Schrader | 148/2 |
| 3,607,456 | 9/1971 | Forand | 148/12 |

OTHER PUBLICATIONS

"Titanium in Iron and Steel", Comstock, John Wiley & Sons, Inc., 1955, pp. 163-184.

*Primary Examiner*—L. Dewayne Rutledge
*Assistant Examiner*—Arthur J. Steiner
*Attorney, Agent, or Firm*—Vincent G. Gioia; Robert F. Dropkin

[57] ABSTRACT

A composite material which has a substantially reduced incidence of defects after drawing, and a method of producing it. The composite material is comprised of at least one layer of plain carbon steel containing up to 1.5% of carbide former present in a carbide former-to-carbon ratio of from about 1.5 to about 25 and at least one layer of stainless steel. It is formed by pressure bonding carbon steel containing carbide former to stainless steel.

5 Claims, 2 Drawing Figures

PRESSURE BONDED COMPOSITE MATERIAL WITH LOW YIELD STRENGTH

This is a continuation, of application Ser. No. 257,649, filed May 30, 1972, now abandoned, which in turn is a division of application Ser. No. 000,177, filed Jan. 2, 1970, now U.S. Pat. No. 3,693,242, issued Sept. 26, 1972.

The present invention relates to a composite material and to a method for producing it and more particularly to a composite material which has a substantially reduced incidence of defects after drawing and to a method for producing it.

Pressure bonded composite members are used in a variety of applications. Cookware is often drawn from composite material comprised of plain carbon and stainless steels. Plain carbon steel is a better heat conductor than is stainless steel. On the other hand, stainless steel has a more attractive appearance and is stain resistant to a variety of contaminants. A composite of the two metals is, however, most desirable as it combines the advantages of each metal.

Deep drawn articles made from pressure bonded plain carbon-stainless steel composite materials have displayed surface defects which become evident during and after drawing. These defects include wavy or wrinkled surfaces and surface ruptures which are exceedingly detrimental as they cannot be satisfactorily removed by techniques such as buffing and grinding.

The present invention improves drawability and substantially reduces the incidence of defects, e.g., the wavy or wrinkled surfaces and surface ruptures. These defects are avoided by adding at least one carbide former to the plain carbon steel prior to pressure bonding. The carbide former precludes carbon migration from the plain carbon steel toward and into the stainless steel and precludes the formation of enriched carbide areas at the joining interface, i.e., the interface between the plain carbon steel and the stainless steel, which I believe are associated with decreased drawability. It is hypothesized that these enriched carbide areas affect the drawability by increasing strength in localized areas and/or by causing melting at the joining interface. Incipient melting can erupt since excessive amounts of carbon will lower the melting point to temperatures approaching those attained during bonding.

It is accordingly an object of this invention to provide a composite material which has a substantially reduced incidence of defects after drawing.

It is another object of this invention to provide a method for producing composite material which has a substantially reduced incidence of defects after drawing.

Figure 2:
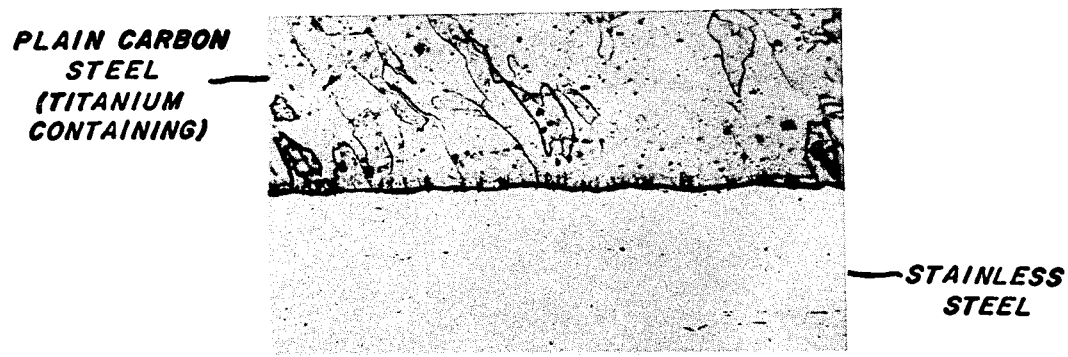

The foregoing and other objects of the invention will be best understood from the following description, reference being had to the accompanying drawings wherein:

FIG. 1 is a photomicrograph at 250X of composite material formed from A.I.S.I. Type 304 stainless steel and A.I.S.I. Type C1006 plain carbon steel; and FIG. 2 is a photomicrograph at 500X of composite material formed from A.I.S.I. Type 304 stainless steel and A.I.S.I. Type C1006 plain carbon steel containing 0.45% titanium.

The article of this invention is a composite material which is substantially free of surface defects after drawing. It is comprised of at least one layer of plain carbon steel containing up to 1.5% of carbide former, with the carbide former being present in a carbide former-to-carbon ratio of from about 1.5 to about 25 and at least one layer of stainless steel which is bonded to the plain carbon steel. In a preferred embodiment the carbon steel contains up to 0.75% of carbide former, with the carbide former being present in a carbide former-to-carbon ratio of from about 5 to about 15. The term carbide former refers to one or more of the elements which have a strong affinity for carbon. Included within the term are titanium, columbium, zirconium, vanadium, tantalum, chromium, molybdenum, tungsten, uranium, boron, and cobalt. Titanium and columbium are preferred as they are relatively strong carbide formers. Economic considerations presently make the use of titanium more desirable than columbium. The amount of carbide former is limited to 1.5% as the benefits obtained from further increases in the level of carbide former are disproportionate with regard to the costs involved. On page 7 of Volume 1 of the Eighth Edition Metals Handbook, put out by the American Society for Metals, carbon steel is defined as follows:

"Steel containing carbon up to about 2% and other residual quantities of other elements except those added for deoxidation, with silicon usually limited to 0.60% and manganese to about 1.65%. Also termed 'plain carbon steel', 'ordinary steel' and 'straight carbon steel'."

As stated above, the ratio of carbide former-to-carbon in the plain carbon steel should be between about 1.5 and 25 and preferably between about 5 and 15. This means that the weight percent of carbide forming elements should be between 1.5 and 25 times the weight percent of carbon. A minimum carbide former-to-carbon ratio of 1.5 is necessary to insure sufficient carbide former to preclude carbon migration from the plain carbon steel toward and into the stainless steel and to preclude the formation of enriched carbide areas, which are associated with decreased drawability, at the joining interface. A minimum preferred carbide former-to-carbon ratio of 5 is desirable since the yield strength of the composite material decreases and the elongation increases with increasing amounts of carbide former. The composite should have a 0.2% yield strength of less than 60,000 and preferably less than 50,000 in order to insure good drawability. An upper ratio limit of 25 is required as the grain size of the carbide former containing plain carbon steel can become undesirably large at higher ratios. Large grain sizes produce rough surfaces and reduce the drawability of the composite material. The ASTM grain size of the plain carbon steel should be at least 3 (higher numbers represent finer grains) after bonding. A maximum carbide former-to-carbon ratio of 15 is preferred because a range of from 5–15 has proven to provide optimum drawability. Yield strength and grain size are significant factors in determining the upper limit of the range.

A comparison of FIGS. 1 and 2 indicates how the addition of carbide former to plain carbon steel precludes carbon migration from the plain carbon steel to the stainless steel during pressure bonding. FIG. 1 is a photomicrograph at 250X of composite material formed from A.I.S.I. Type 304 stainless steel and A.I.S.I. Type C1006 plain carbon steel. Note the layer of "individual" carbide particles located in the stainless steel adjacent to the joining interface. FIG. 2 is a photomicrograph at 500X of composite material formed from A.I.S.I. Type 304 stainless steel and A.I.S.I. Type C1006 plain carbon steel containing 0.45% titanium and having a titanium-to-carbon ratio of 11.3. Note that there is a dearth of carbide particles at the joining interface at 500X whereas, carbide particles were evident in FIG. 1 at 250X.

The formation of enriched carbide areas at the joining interface of plain carbon - stainless steel composite material is not totally evident from the chemistries of the plain carbon steel and stainless steel. Carbon migration can and often does occur in a direction opposite to the carbon gradient, i.e., from a material of lower carbon content to one of higher carbon content. The direction of carbon migration is dependent upon the attainment of a condition of lower free energy and not strictly upon concentration gradients. For example, carbon will frequently diffuse from plain carbon steel of a lower carbon content to stainless steel of a higher carbon content as diffusion in this direction will often favor a condition of lower free energy since the stainless steel contains chromium which attracts the carbon from the plain carbon steel.

The method of this invention comprises the steps of: providing at least one layer of plain carbon steel containing up to 1.5%, preferably up to 0.75%, of carbide former, e.g., titanium, with the carbide former being present in a carbide former-to-carbon ratio of from about 1.5 to about 25, preferably from about 5 to about 15; providing at least one layer of stainless steel; superimposing the layers of plain carbon steel and stainless steel; and pressure bonding the layers to each other.

Formation of the pressure bond is dependent upon pressure and heat. Typical methods of applying the pressure include roll stands, platens and explosives. The heat can be supplied by external means or can be produced by the very means which supply the pressure, e.g., explosives generate heat at the bonding interface. Illustrative methods of externally supplying heat include furnaces, resistance heating and lasers. For best results, it is preferable to bond in a non-oxidizing atmosphere such as a vacuum, inert gas, e.g., argon, or reducing gas, e.g., hydrogen.

Hot roll bonding is one specific method for forming the pressure bond of this invention. The layers to be joined are rolled together at a temperature in excess of 1600°F and preferably at a temperature within the range of 1900° to 2300°F.

The composite material formed in accordance with the method of this invention can be cold rolled to desired gauge after bonding. Cold working, however, may necessitate a subsequent heat treatment to develop properties suitable for drawing. The heat treatment generally comprises an anneal at a temperature in excess of 1800°F.

The following examples are illustrative of several aspects of the invention.

Composites having two layers of stainless steel with a layer of plain carbon steel containing titanium sandwiched therebetween, were formed for a subsequent drawing operation. The plain carbon steel came from heats A and B whose chemistry is given below in Table 1 and the stainless was A.I.S.I. Type 304.

TABLE I

| Heat | C | Mn | P | CHEMISTRY S | Si | Al | Ti | Ti/C |
|---|---|---|---|---|---|---|---|---|
| A | 0.06 | 0.33 | 0.006 | 0.018 | 0.06 | 0.05 | 0.14 | 2.3 |
| B | 0.04 | 0.35 | 0.005 | 0.20 | 0.04 | 0.069 | 0.45 | 11.3 |

The composites were formed by: assembling the steel layers to be joined in such a manner that a layer of plain carbon steel was sandwiched between two larger layers of stainless steel which overlapped the edges of the carbon steel; welding bars of stainless steel around the edges of the carbon steel so as to form a pack which enclosed and protected the joining interfaces from exposure to the atmosphere; evaporating the pack with a valve inserted through the stainless steel bars; heating the pack to a temperature of approximately 2250°F; and hot rolling the pack.

The packs were approximately 5 inches thick prior to hot roll bonding and approximately 0.170 inch thick thereafter. After hot rolling, the packs were annealed, cold rolled to intermediate gauge, annealed, and divided into four groups. Two of the groups $A_1$ and $A_2$, were formed from heat A plain carbon steel, whereas the other two groups, $B_1$ and $B_2$, were formed from heat B plain carbon steels. Groups $A_1$ and $A_2$ were cold rolled to 0.031 inch and groups $B_1$ and $B_2$ were cold rolled to 0.037 inch. All four groups were subsequently annealed at 1975°F. Groups $A_1$ and $B_1$ were annealed for a period of time equal to 25 minutes per inch of thickness. Groups $A_2$ and $B_2$ were annealed for a period of time equal to 50 minutes per inch of thickness. The samples from each group were air cooled, water quenched, or air cooled from 900°F, after annealing. The 0.2% yield strength, elongations and grain sizes for the samples of each group are given below in Table II, as well as the degree of carbon migration which was detected at 250X.

TABLE II

| | CHEMISTRY | | | ANNEALING CONDITIONS | | | 0.2% Y.S. | % Elongation | MICROSTRUCTURE | | | |
|---|---|---|---|---|---|---|---|---|---|---|---|---|
| Heat | C | Ti | Ti/C | Temp. (°F) | Time (mins./in.) | Quench | (p.s.i.) | (2") | ASTM Grain Size Cladding | Core | Cladding | Carbon Migration In Cladding (280X) |
| $A_1$ | 0.06 | 0.14 | 2.3 | — | — | — | 133,000 | 3.0 | — | — | — | Nothing Noted |
| $A_1$ | 0.06 | 0.14 | 2.3 | 1975 | 25 | A.C. | 58,000 | 35.0 | 9 | 8–7 | 9 | Light Migration |
| $A_1$ | 0.06 | 0.14 | 2.3 | 1975 | 25 | H$_2$O | 67,000 | 23.5 | 9 | — | 9 | Light Migration |
| $A_1$ | 0.06 | 0.14 | 2.3 | 1975 | 25 | AC900°F | 59,000 | 39.0 | 9 | 8 | 9 | Very Light Migration |
| $A_2$ | 0.06 | 0.14 | 2.3 | — | — | — | 133,000 | 3.0 | — | — | — | Nothing Noted |
| $A_2$ | 0.06 | 0.14 | 2.3 | 1975 | 50 | A.C. | 55,000 | 26.0 | 8–7 | — | 8–7 | Nothing Noted |
| $A_2$ | 0.06 | 0.14 | 2.3 | 1975 | 50 | H$_2$O | 71,000 | 17.0 | 8–7 | — | 8–7 | Nothing Noted |
| $A_2$ | 0.06 | 0.14 | 2.3 | 1975 | 50 | AC900°F | 56,000 | 29.0 | 8 | 8–6 | 8 | Nothing Noted |
| $B_1$ | 0.04 | 0.45 | 11.3 | — | — | — | 111,000 | 4.0 | — | — | — | Nothing Noted |
| $B_1$ | 0.04 | 0.45 | 11.3 | 1975 | 25 | A.C. | 31,000 | 44.5 | 9 | 5 | 9 | Nothing Noted |
| $B_1$ | 0.04 | 0.45 | 11.3 | 1975 | 25 | H$_2$O | 53,000 | 44.0 | 10 | — | 10 | Nothing Noted |
| $B_1$ | 0.04 | 0.45 | 11.3 | 1975 | 25 | AC900°F | 33,000 | 46.0 | 10 | 5–4 | 10 | Nothing Noted |

TABLE II-continued

| Heat | CHEMISTRY C | Ti | Ti/C | ANNEALING CONDITIONS Temp. (°F) | Time (mins./in.) | Quench | 0.2% Y.S. (p.s.i.) | % Elongation (2") | MICROSTRUCTURE ASTM Grain Size Cladding | Core | Cladding | Carbon Migration In Cladding (280X) |
|---|---|---|---|---|---|---|---|---|---|---|---|---|
| $B_2$ | 0.04 | 0.45 | 11.3 | — | — | — | 111,000 | 4.0 | — | — | — | Nothing Noted |
| $B_2$ | 0.04 | 0.45 | 11.3 | 1975 | 50 | A.C. | 35,000 | 45.5 | 8 | 6 | 8 | Nothing Noted |
| $B_2$ | 0.04 | 0.45 | 11.3 | 1975 | 50 | $H_2O$ | 62,000 | 29.5 | 8-7 | — | 8-7 | Nothing Noted |
| $B_2$ | 0.04 | 0.45 | 11.3 | 1975 | 50 | AC900°F | 36,000 | 42.0 | 8 | 6-5 | 8 | Nothing Noted |

Table II reveals how the degree of carbon migration decreases with increasing carbide former-to-carbon ratios, how the yield strength decreases and elongation increases with increasing carbide former-to-carbon ratios, and how the grain size of the plain carbon steel containing titanium increases with increasing carbide former-to-carbon ratios. Some light and very light carbon migration was evident at 250X in group $A_1$, which had a titanium-to-carbon ratio of 2.3, whereas no carbon migration was evident at 250X in group $B_1$ which had a titanium-to-carbon ratio of 11.3 even though groups $A_1$ and $B_1$ were similarly treated. Groups $B_1$ and $B_2$ which had titanium-to-carbon ratios of 11.3 had 0.2% yield strengths which were respectively lower and elongations which were respectively higher than groups $A_1$ and $A_2$ which had titanium-to-carbon ratios of 2.3, even though groups $A_1$ and $B_1$ and groups $A_2$ and $B_2$ were similarly treated. Larger grain sizes (smaller numbers indicate larger grains) were evident in the core of groups $B_1$ and $B_2$, i.e., in the titanium containing plain carbon steel layer of groups $B_1$ and $B_2$, which had titanium-to-carbon ratios of 11.3, than were evident in the core of groups $A_1$ and $A_2$ which had titanium-to-carbon ratios of 2.3 even though groups $A_1$ and $B_1$ and groups $A_2$ and $B_2$ were similarly treated.

It will be apparent to those skilled in the art that the novel principles of the invention disclosed herein in connection with specific examples thereof will suggest various other modifications and applications of the same. It is accordingly desired that in construing the breadth of the appended claims they shall not be limited to the specific examples of the invention described herein.

I claim:

1. A pressure bonded composite material comprising a first layer bonded to at least one layer of stainless steel along a joining interface which is substantially free from enriched carbide areas; said first layer consisting essentially of plain carbon steel containing up to 0.75% of carbide former from the group consisting of titanium and columbium, said carbide former being present in a carbide former-to-carbon ratio of from 5 to 15; said composite material having a 0.2% yield strength of less than 50,000 pounds per square inch.

2. A composite material according to claim 1 wherein said carbide former is titanium.

3. A composite material according to claim 1 wherein at least one layer of said stainless steel is Type 304 stainless steel.

4. A composite material according to claim 1 wherein said first layer has an ASTM grain size of at least 3.

5. A composite material according to claim 1 comprising two layers of stainless steel with a layer of said steel containing carbide former sandwiched therebetween.

* * * * *